(12) United States Patent
You et al.

(10) Patent No.: US 9,666,894 B2
(45) Date of Patent: May 30, 2017

(54) BATTERY MODULE AND METHOD FOR MANUFACTURING THE SAME

(71) Applicant: SK Innovation Co., Ltd., Seoul (KR)

(72) Inventors: Gil Jae You, Daejeon (KR); Ji Seok Lee, Sejong (KR); Hyun Jin Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 170 days.

(21) Appl. No.: 14/397,735

(22) PCT Filed: Apr. 1, 2013

(86) PCT No.: PCT/KR2013/002683
§ 371 (c)(1),
(2) Date: Oct. 29, 2014

(87) PCT Pub. No.: WO2013/165098
PCT Pub. Date: Nov. 7, 2013

(65) Prior Publication Data
US 2015/0125723 A1    May 7, 2015

(30) Foreign Application Priority Data

May 4, 2012    (KR) .................. 10-2012-0047352

(51) Int. Cl.
| | |
|---|---|
| *H01M 10/04* | (2006.01) |
| *B60L 11/18* | (2006.01) |
| *H01M 2/24* | (2006.01) |
| *H01M 10/625* | (2014.01) |
| *H01M 10/653* | (2014.01) |
| *H01M 10/6557* | (2014.01) |

(Continued)

(52) U.S. Cl.
CPC ......... *H01M 10/04* (2013.01); *B60L 11/1864* (2013.01); *B60L 11/1874* (2013.01); *B60L 11/1879* (2013.01); *H01M 2/24* (2013.01); *H01M 10/5044* (2013.01); *H01M 10/5061* (2013.01); *H01M 10/613* (2015.04); *H01M 10/625* (2015.04); *H01M 10/653* (2015.04); *H01M 10/6555* (2015.04); *H01M 10/6557* (2015.04); *H01M 6/5038* (2013.01); *H01M 10/655* (2015.04); *H01M 2220/20* (2013.01); *Y02T 10/7005* (2013.01); *Y02T 10/7061* (2013.01); *Y10T 29/49115* (2015.01)

(58) Field of Classification Search
None
See application file for complete search history.

(56) References Cited

U.S. PATENT DOCUMENTS 5,310,141 A * 5/1994 Homer .................. B64G 1/425
136/222
6,653,002 B1 * 11/2003 Parise .................. B01F 5/0614
136/200

(Continued)

*Primary Examiner* — Jeremiah Smith
(74) *Attorney, Agent, or Firm* — The Webb Law Firm

(57) ABSTRACT

Provided are a battery module and a method for manufacturing the same. The battery module includes: a plurality of battery cells spaced apart from each other by a predetermined interval and stacked in parallel with each other; a plurality of heat exchange members integrally formed by connecting parts connecting between two partition walls neighboring to each other among partition walls each slid between the battery cells, respectively; and a filler applied onto the heat exchange members.

4 Claims, 5 Drawing Sheets

(51) Int. Cl.
*H01M 10/6555* (2014.01)
*H01M 10/613* (2014.01)
*H01M 10/656* (2014.01)
H01M 6/50 (2006.01)
H01M 10/655 (2014.01)

(56) References Cited

U.S. PATENT DOCUMENTS

| | | | | |
|---|---|---|---|---|
| 2006/0132101 | A1* | 6/2006 | Ambrosio | B60L 11/1855 320/150 |
| 2008/0305388 | A1* | 12/2008 | Haussman | H01M 2/105 429/120 |
| 2009/0214940 | A1* | 8/2009 | Haussmann | H01M 2/1077 429/120 |
| 2010/0330408 | A1 | 12/2010 | Yoon et al. | |
| 2011/0027640 | A1 | 2/2011 | Gadawski et al. | |
| 2011/0052960 | A1 | 3/2011 | Kwon et al. | |
| 2011/0151300 | A1* | 6/2011 | Herrmann | H01M 10/0413 429/120 |
| 2011/0212355 | A1 | 9/2011 | Essinger et al. | |
| 2011/0300428 | A1 | 12/2011 | Sohn | |
| 2012/0028156 | A1 | 2/2012 | Song et al. | |
| 2012/0094165 | A1* | 4/2012 | Valencia, Jr. | H01M 10/0525 429/120 |
| 2012/0214033 | A1* | 8/2012 | Damon | H01M 2/0212 429/82 |
| 2013/0115506 | A1* | 5/2013 | Wayne | H01M 10/5044 429/120 |
| 2013/0171493 | A1* | 7/2013 | Wayne | F28F 3/12 429/120 |

* cited by examiner

BATTERY MODULE AND METHOD FOR MANUFACTURING THE SAME

CROSS-REFERENCE TO RELATED APPLICATIONS

This application is the United States national phase of International Application No. PCT/KR2013/002683 filed Apr. 1, 2013, and claims priority to Korean Patent Application No. 10-2012-0047352 filed May 4, 2012, the disclosures of which are hereby incorporated in their entirety by reference.

TECHNICAL FIELD

The present invention relates to a battery module and a method for manufacturing the same, and more particularly, to a battery module including a heat exchange member capable of improving heat exchange performance, and a method for manufacturing the same.

BACKGROUND ART

Recently, a rechargeable secondary battery has been widely used as an energy source of a wireless mobile device. In addition, the secondary battery has been spotlighted as a power source of an electric vehicle (EV), a hybrid electric vehicle (HEV), a plug-in hybrid electric vehicle (Plug-In HEV), and the like, that have been suggested as a scheme for solving air pollution of an existing gasoline vehicle, diesel vehicle, or the like, using fossil fuel.

Small-sized mobile devices use one to four battery cells per one device. In contrast, middle or large-sized devices such as a vehicle, or the like, require high output and large capacity, such that they use a middle or large-sized battery module in which a plurality of battery cells are electrically connected to each other.

Since it is preferable that the middle or large-sized battery module is manufactured to have a size and weight as small as possible, it may be integrated at a high degree of integration. In addition, a prismatic battery, a pouch type battery, or the like, having weight small as compared with capacity has been mainly used as a battery cell of the middle or large-sized battery module. Particularly, the pouch type battery using an aluminum laminate sheet, or the like, as an exterior member has been recently interested mainly due to advantages such as small weight, a low manufacturing cost, easy deformation, and the like.

Since the battery cells configuring the middle or large-sized are configured of the rechargeable secondary batteries, the high output and large capacity secondary battery as described above generates a large amount of heat in a process in which it is charged or discharged. Particularly, since a surface of a laminate sheet of the pouch type battery widely used in the battery module is coated with a polymer material having low thermal conductivity, it is difficult to effectively decrease a temperature of all of the battery cells.

In the related art (US 2011-0052960), a secondary battery module including a plurality of cooling channels disposed in parallel with each other so as to face each other and closed so that a heat transfer medium may flow therein; a plurality of unit batteries disposed between the plurality of cooling channels; supply channels supplying the heat transfer medium to the cooling channels; discharge channels discharging the heat transfer medium from the cooling channels; and spacers disposed in the cooling channels to maintain intervals in the cooling channels has been disclosed.

However, in the related art, the plurality of cooling channels and the plurality of unit batteries are not closely adhered to each other, such that thermal conductivity is decreased.

Further, it is obvious that when the thermal conductivity is decreased, cooling efficiency is decreased.

Therefore, there is a need to develop a battery module including a heat exchange member capable of further improving the thermal conductivity.

RELATED ART DOCUMENT

Patent Document

US 2011-0052960 A1 (2011. 03. 03)

DISCLOSURE OF INVENTION

Technical Problem

An object of the present invention is to provide a battery module having improved thermal conductivity, and a method for manufacturing the same.

Solution to Problem

In one general aspect, a battery module includes: a plurality of battery cells spaced apart from each other by a predetermined interval and stacked in parallel with each other; a plurality of heat exchange members integrally formed by connecting parts connecting between two partition walls neighboring to each other among partition walls each slid between the battery cells, respectively; and a filler applied onto the heat exchange members.

At least one battery cell may be interposed between the two partition walls of the heat exchange member neighboring to each other.

The heat exchange member may include a channel formed therein so as to receive a heat exchange medium therein.

The connecting part may be formed in a shape in which it is bent at a predetermined curvature.

The battery module may further include heat exchange pipes seated in the connecting parts and having a heat exchange medium circulated therein.

In another general aspect, a battery module includes: a plurality of battery cells spaced apart from each other by a predetermined interval and stacked in parallel with each other; a plurality of heat exchange members integrally formed by connecting parts connecting between two first partition walls neighboring to each other and two second partition walls neighboring to each other among partition walls each slid between the battery cells and each divided into first and second partition walls, respectively; and a filler applied onto the heat exchange members.

Each of the first partition walls and the second partition walls may have one connecting part per one pair.

The connecting part may be formed in a shape in which it is bent at a predetermined curvature.

At least one battery cell may be interposed between the two first partition walls or the two second partition walls of the heat exchange member neighboring to each other.

The heat exchange member may include a channel formed therein so as to receive a heat exchange medium therein.

The battery module may further include heat exchange pipes seated in the connecting parts and having a heat exchange medium circulated therein.

In still another general aspect, a battery module includes: a plurality of battery cells spaced apart from each other by a predetermined interval and stacked in parallel with each other; a plurality of heat exchange members integrally formed by connecting parts sequentially connecting between external partition walls and a first or second partition wall neighboring to the external partition walls, two first partition walls neighboring to each other, and two second partition walls neighboring to each other among a plurality of partition walls which are each slid between the battery cells and among which remaining partition walls except for a pair of external partition walls positioned at the outermost sides in a direction in which the battery cells are stacked are divided into the first partition walls and the second partition walls, respectively; and a filler applied onto the heat exchange members.

Each of the first partition walls and the second partition walls may have one connecting part per one pair.

The connecting part may be formed in a shape in which it is bent at a predetermined curvature.

At least one battery cell may be interposed between the two partition walls of the heat exchange member neighboring to each other.

The heat exchange member may include a channel formed therein so as to receive a heat exchange medium therein.

The battery module may further include heat exchange pipes seated in the connecting parts and having a heat exchange medium circulated therein.

In still another general aspect, a method for manufacturing a battery module includes: spacing a plurality of battery cells apart from each other by a predetermined interval and stacking the plurality of battery cells in parallel with each other; preparing heat exchange members integrally formed by connecting parts connecting between two partition walls neighboring to each other among a plurality of partition walls arranged in parallel with each other, respectively; applying a filler onto surfaces of the heat exchange members; seating heat exchange pipes in the connecting parts of the heat exchange members; and sliding the partition walls between the battery cells, respectively.

The connecting part may be formed in a shape in which it is bent at a predetermined curvature.

Advantageous Effects of Invention

The battery module according to the exemplary embodiment of the present invention has a relatively simple configuration and the decreased number of components, such that a manufacturing cost may be decreased In addition, in the battery module according to the exemplary embodiment of the present invention, the clearance between the battery cells and the heat exchange members is decreased, such that thermal conduction rates of the battery cells and the heat exchange members may be maximized.

BRIEF DESCRIPTION OF DRAWINGS

The above and other objects, features and advantages of the present invention will become apparent from the following description of preferred embodiments given in conjunction with the accompanying drawings, in which.

Figure 1:
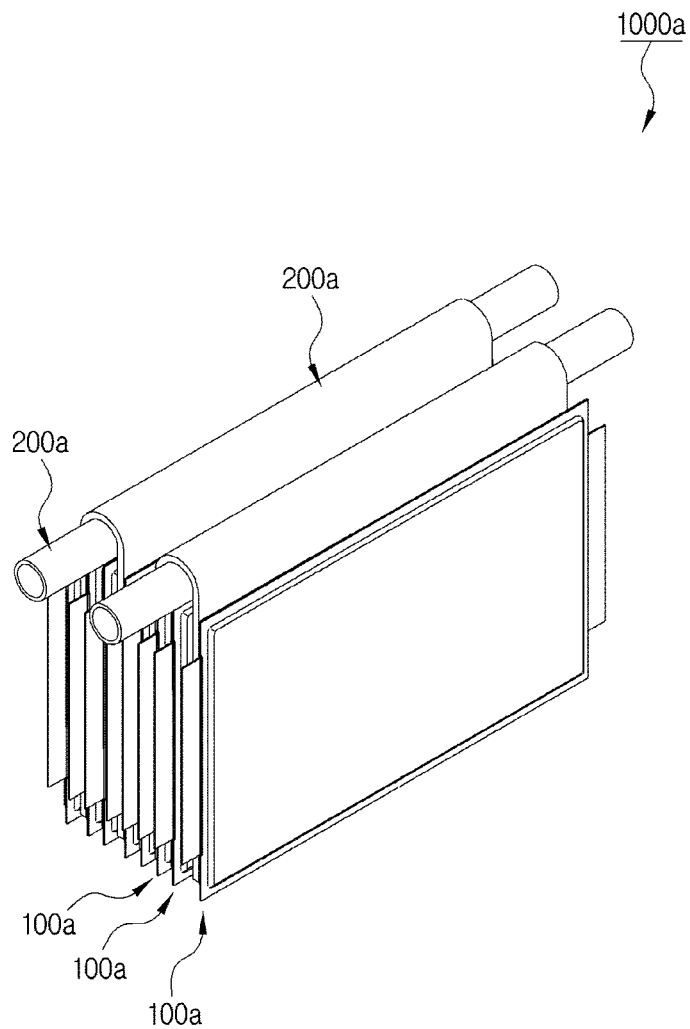
FIG. 1 is a perspective view showing a battery module according to a first exemplary embodiment of the present invention.

DETAILED DESCRIPTION OF MAIN ELEMENTS 1000a, b, c: Battery modules according to exemplary embodiments of the present invention
100a, b, c: Battery cells
200a, b, c: Heat exchange members
210a, b, c: Partition walls
211c, 215c: External partition walls
212b, c: First partition walls 214b, c: Second partition walls
220a, b, c: Connecting parts
300a, b, c: Heat exchange pipes

BEST MODE FOR CARRYING OUT THE INVENTION

Hereinafter, specific contents of the present invention will be described in more detail with reference to the accompanying drawings.

However, the accompanying drawings are only examples shown in order to describe the technical idea of the present invention in more detail. Therefore, the technical idea of the present invention is not limited to shapes of the accompanying drawings.

Figure 2:
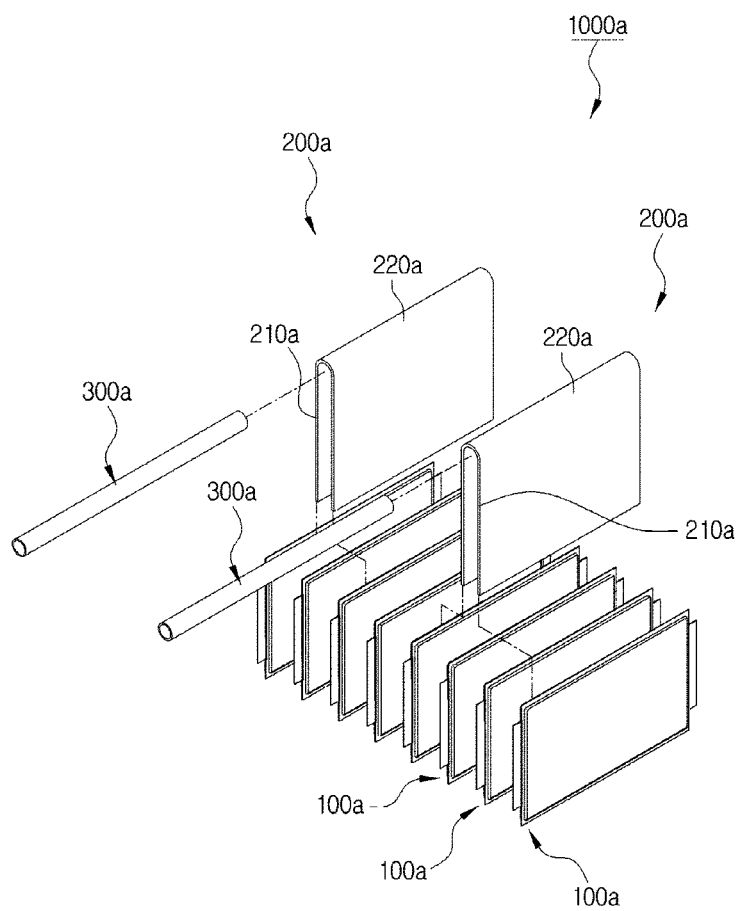
FIG. 2 is an exploded perspective view showing the battery module according to the first exemplary embodiment of the present invention.

FIG. 1 is a perspective view showing a battery module according to a first exemplary embodiment of the present invention; FIG. 2 is an exploded perspective view showing the battery module according to the first exemplary embodiment of the present invention; and FIG. 3 is a cross-sectional view showing the battery module according to the first exemplary embodiment of the present invention.

Figure 3:
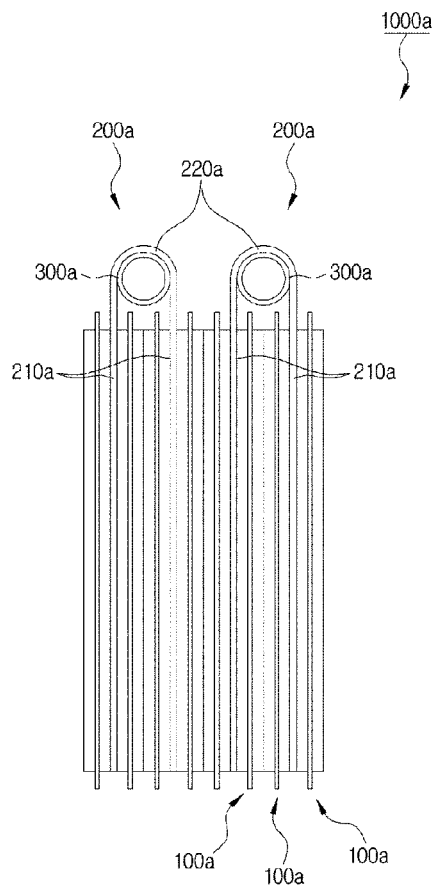
FIG. 3 is a cross-sectional view showing the battery module according to the first exemplary embodiment of the present invention.

As shown in FIGS. 1 to 3, the battery module 1000a according to the first exemplary embodiment of the present invention is configured to include a plurality of battery cells 100a, a plurality of heat exchange members 200a, a filler, and heat exchange pipes 300a.

The battery cells 100a, which are components charged with power or discharging the power, are spaced apart from each other by a predetermined interval and are stacked in parallel with each other.

Here, the battery cells 100a include electrode tabs formed at one side or both sides of an electrode assembly formed in a plate shape.

Although the example in which the electrode tabs are formed at both sides of the electrode assembly is shown in FIGS. 1 to 3, the present invention is not limited thereto, but may also be applied to the battery cell 100a in which the electrode tab is formed at one side of the electrode assembly.

In addition, each of the electrode tabs of the battery cells 100a are connected in series or parallel with each other.

The plurality of heat exchange members 200a are integrally formed by connecting parts 220a connecting between two partition walls neighboring to each other among partition walls 210a each slid between the battery cells 100a, respectively.

That is, the plurality of heat exchange members 200a are formed in a flat panel heat pipe shape, respectively.

Surfaces of the heat exchange members 200a are applied with the filler, respectively, in order to improve close adhesion between the heat exchange members 200 and the battery cells 100a. As the filler, a thermally conductive grease or a thermally conductive pad may be used.

The partition walls 210a are formed in a plate shape and are each slid between the battery cells 100a and are then closely adhered to each other by the filler.

The connecting part 220a is formed in a shape in which it is bent outwardly of the battery cells 100a at a predetermined curvature.

In addition, it is preferable that the connecting parts 220a are formed at one side of the battery cells 100a, respectively, in order to simplify the manufacture of the heat exchange member 200a.

Further, it is preferable that at least two battery cells 100a are interposed between two partition walls 210a of the heat exchange member 200a neighboring to each other in order to decrease the entire size of the battery module 1000a.

Further, it is preferable that the heat exchange member 200a is made of a material having high thermal conductivity, such as aluminum or copper. However, the heat exchange member 200a may also be made of other materials capable of more rapidly transferring heat.

Therefore, the battery module 1000a according to the exemplary embodiment of the present invention has a relatively simple configuration and the decreased number of components, such that a manufacturing cost may be decreased.

In addition, according to the exemplary embodiment of the present invention, the surfaces of the heat exchange members 200a are applied with the filler and the heat exchange members 200a are slid between the battery cells 100a, respectively, such that a clearance between the battery cells 100a and the heat exchange members 200a may be decreased.

Particularly, when the clearance between the battery cells 100a and the heat exchange members 200a is decreased, thermal conduction rates of the battery cells 100a and the heat exchange members 200a may be maximized.

The heat exchange pipe 300a, which is a pipe seated in the connecting part 220a, is connected to an external heat exchange medium circulating device so that a heat exchange medium may be circulated therein.

In addition, an outer peripheral surface of the heat exchange pipe 300a may be coupled to the connecting part 220a by soldering, brazing, or welding.

Meanwhile, the heat exchange member 200a may include a channel formed therein in order to circulate and receive the heat exchange medium therein, thereby maximizing heat exchange efficiency, which will be described in detail below.

Figure 4:
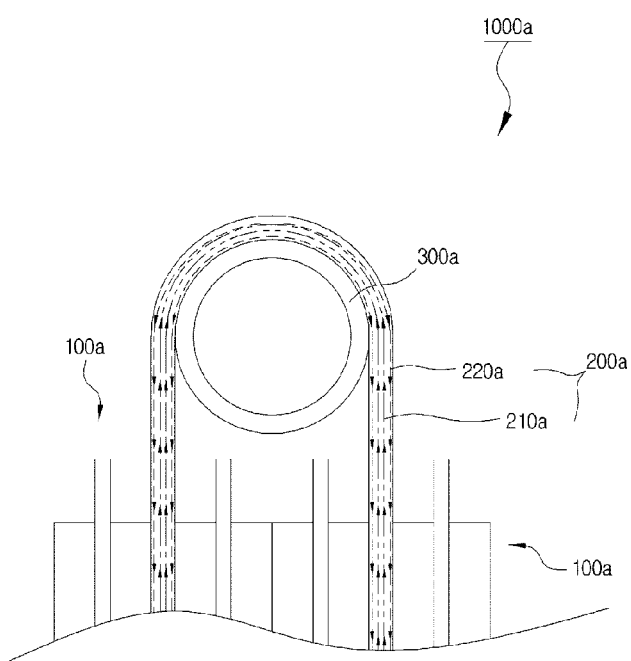
FIG. 4 is a view showing an internal flow of a heat exchange member according to the first exemplary embodiment of the present invention.

FIG. 4 is a view showing an internal flow of a heat exchange member according to the first exemplary embodiment of the present invention.

As shown in FIG. 4, heat generated in the battery cell 100a is primarily conducted to the partition wall 210a of the heat exchange member 200a. Here, the heat exchange medium in the partition wall 210a of the heat exchange member 200a starts to be automatically circulated while being changed from a liquid state into a gas state.

The heat conducted to the partition wall 210a of the heat exchange member 200a is heat-exchanged with the heat exchange medium circulated in the heat exchange member 200a and is conducted to the heat exchange pipe 300a through the connecting part 220a of the heat exchange member 200a.

The heat conducted to the heat exchange pipe 300a is heat-exchanged with the heat exchange medium circulated in the heat exchange pipe 300a and is again transferred to the connecting pipe 220a of the heat exchange member 200a. In this case, the heat exchange medium in the connecting part 220a of the heat exchange member 200a is changed from a gas state into a liquid state and is moved to the partition wall 210a of the heat exchange member 200a.

Therefore, the heat exchange member 200a according to the exemplary embodiment of the present invention immediately receives the heat generated in the battery cell 100a and heat-exchanges the heat, such that the heat exchange medium is circulated only when the heat is generated and a heat exchange effect is maximized.

Meanwhile, the battery module 1000a according to the first exemplary embodiment of the present invention may also perform the heat exchange in a scheme in which the heat exchange pipes 300a are removed, and the partition walls 210a of the heat exchange members 200a receive the heat of the battery cells 100a and discharge the heat to external air through the connecting part of the heat exchange member 200a.

Figure 5:
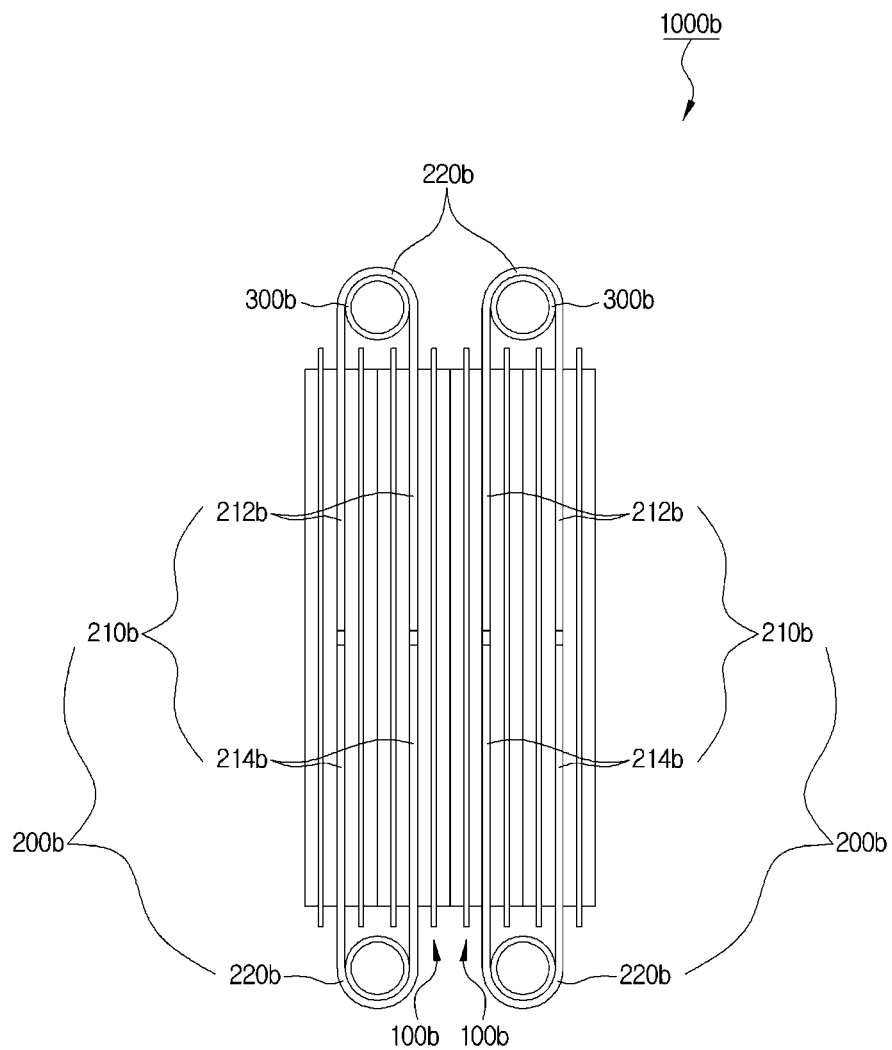
FIG. 5 is a cross-sectional view showing a battery module according to a second exemplary embodiment of the present invention.

FIG. 5 is a cross-sectional view showing a battery module according to a second exemplary embodiment of the present invention.

As shown in FIG. 5, the battery module 1000b according to the second exemplary embodiment of the present invention is configured to include a plurality of battery cells 100b, heat exchange members 200b, a filler, and a plurality of heat exchange pipes 300b. Here, unless specifically described, components of the battery modules 1000b according to the second exemplary embodiment of the present invention are the same as those of the battery modules 1000a according to the first exemplary embodiment of the present invention, respectively.

The plurality of heat exchange members 200b are integrally formed by connecting parts 220b connecting between two first partition walls 212b neighboring to each other and two second partition walls 214b neighboring to each other among partition walls 210b each slid between the battery cells 100b and each divided into first and second partition walls 212b and 214b, respectively.

That is, each of the first partition walls 212b and the second partition walls 214b has one connecting part 220b per one pair neighboring to each other.

In addition, the plurality of heat exchange members 200b may be classified into a plurality of first sub heat exchange members integrally formed by the connecting part 220b connecting between the two first partition walls 212b neighboring to each other and a plurality of second sub heat exchange members integrally formed by the connecting part 220b between the two second partition walls 214b neighboring to each other.

A surface of the heat exchange member 200b is filled with the filler. As the filler, a thermally conductive grease or a thermally conductive pad may be used.

The partition walls 210b are formed in a plate shape and are each slid between the battery cells 100b and are then closely adhered to each other by the filler.

The connecting part 220b is formed in a shape in which it is bent outwardly of the battery cells 100b at a predetermined curvature.

In addition, it is preferable that the connecting parts 220*b* connecting between the first partition walls 212*b* are formed in parallel with each other at one sides of the battery cells 100*b* and the connecting parts 220*b* connecting between the second partition walls 214*b* are formed in parallel with each other at the other sides of the battery cells 100*b* in order to simplify the manufacture of the entire heat exchange member 200*b*.

Further, it is preferable that at least two battery cells 100*b* are interposed between two partition walls 210*b* of the heat exchange member 200*b* neighboring to each other in order to decrease the entire size of the battery module 1000*b*.

The number of connecting parts 220*b* is further increased in the battery module 1000*b* according to the second exemplary embodiment of the present invention as compared with the battery module 1000*a* according to the first exemplary embodiment of the present invention, such that more heat exchange pipes 300*b* are mounted, thereby making it possible to maximize a heat exchange rate.

Figure 6:
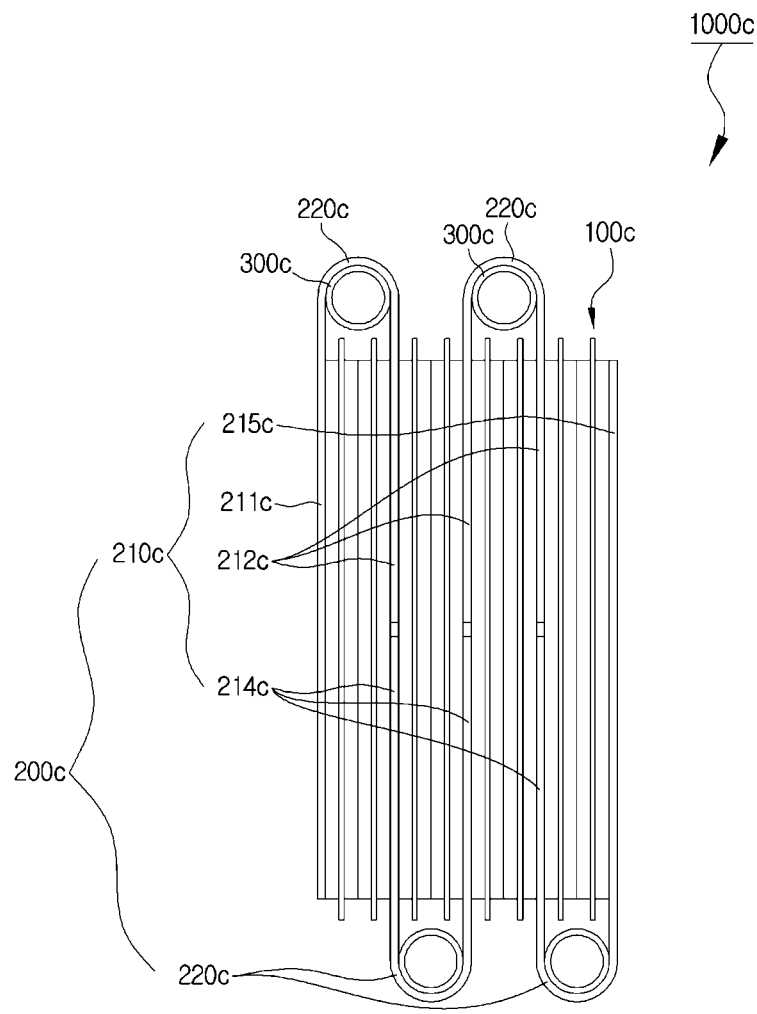
FIG. 6 is a cross-sectional view showing a battery module according to a third exemplary embodiment of the present invention.

FIG. 6 is a cross-sectional view showing a battery module according to a third exemplary embodiment of the present invention.

As shown in FIG. 6, the battery module 1000*c* according to the third exemplary embodiment of the present invention is configured to include a plurality of battery cells 100*c*, heat exchange members 200*c*, a filler, and heat exchange pipes 300*c*. Here, unless specifically described, components of the battery modules 1000*c* according to the third exemplary embodiment of the present invention are the same as those of the battery modules 1000*a* according to the first exemplary embodiment of the present invention, respectively.

The plurality of heat exchange members 200*c* are integrally formed by connecting parts 220*c* connecting between an external partition wall 211*c* and a first partition wall 212*c* neighboring to the external partition wall 211*c* , alternately connecting between two second partition walls 214*c* neighboring to each other and between two first partition walls 212*c* neighboring to each other, and an external partition wall 215*c* and a second partition wall 215*c* neighboring to the external partition wall 215*c* among a plurality of partition walls 210*c* which are each slid between the battery cells 100*c* and among which remaining partition walls 210 except for a pair of external partition walls 211*c* and 215*c* positioned at the outermost sides in a direction in which the battery cells 100*c* are stacked are divided into the first partition walls 212*c* and the second partition walls 214*c* , respectively.

That is, each of the first partition walls 212*c* and the second partition walls 214*c* has one connecting part 220*b* per one pair neighboring to each other.

In addition, the plurality of heat exchange member 200*c* may be classified into a plurality of third sub heat exchange members integrally formed by a connecting part 220*c* between the two first partition walls 212*c* neighboring to each other, a plurality of fourth sub heat exchange members integrally formed by a U-shaped connecting part 220*c* connecting between the two second partition walls 214*c* neighboring to each other, and a plurality of fifth sub heat exchange members integrally formed by a U-shaped connecting part 220*c* connecting between the external partition wall 211*c* or 215*c* and the first partition wall 212*c* or the second partition wall 214*c* neighboring to the external partition wall 211*c* or 215*c*.

A surface of the heat exchange member 200*c* is filled with the filler. As the filler, a thermally conductive grease or a thermally conductive pad may be used.

The partition walls 210*c* are formed in a plate shape and are each slid between the battery cells 100*c* and are then closely adhered to each other by the filler.

The connecting part 220*c* is formed in a shape in which it is bent outwardly of the battery cells 100*c* at a predetermined curvature.

Referring to FIG. 6, the connecting parts 220*c* are formed in a zigzag shape at one side and the other side of the battery cells 100*c*.

Meanwhile, a method for manufacturing a battery module according to the exemplary embodiment of the present invention will be described in detail.

First, the plurality of battery cells are spaced apart from each other by a predetermined interval and are stacked in parallel with each other.

Then, heat exchange members including a plurality of partition walls spaced apart from each other by an interval wider than an interval by which the battery cells spaced apart from each other and U shaped connecting parts integrally connecting between two partition walls neighboring to each other among the plurality of partition walls are prepared.

Next, surfaces of the heat exchange members are applied with a filler, which is a thermally conductive grease or a thermally conductive pad.

Next, heat exchange pipes are seated in the connecting parts of the heat exchange members and are then soldered or welded to the connecting parts so as not to be separated from the connecting parts.

Next, partition walls of the heat exchange members are slid between the battery cells, respectively, to complete the manufacture of the battery module.

Therefore, the method for manufacturing a battery module according to the exemplary embodiment of the present invention is convenient and simple and requires a low cost. In addition, with the method for manufacturing a battery module according to the exemplary embodiment of the present invention, the battery module may be simply manufactured.

The present invention is not limited to the above-mentioned exemplary embodiments, and may be variously applied, and may be variously modified without departing from the gist of the present invention claimed in the claims.

The invention claimed is:

1. A battery module comprising:
 a) a plurality of battery cells spaced apart from each other by a predetermined interval and stacked in parallel with each other;
 b) a plurality of heat exchange members including a pair of external partition walls positioned at the outermost sides of the stacked battery cells in a direction in which the battery cells are stacked;
 c) internal partition walls which are slid between the stacked battery cells;
 d) connecting parts connecting external partition walls and internal partition walls that are adjacent to one another and connecting parts connecting internal partition walls with other internal partition walls that are adjacent to one another;
 e) wherein each internal partition wall is divided into a first partition wall positioned at an upper side of the battery cells and a second partition wall positioned at a lower side of the battery cells and separate from the first partition wall;
 f) wherein the connecting parts comprise;
  1) external connecting parts connecting the external partition walls and the internal partition walls adjacent to the external partition walls;

2) first internal connecting parts connecting two first partition walls adjacent to each other; and
3) second internal connecting parts connecting two second partition walls adjacent to each other;

g) a filler applied onto the heat exchange members;
h) a heat exchange pipe seated in each of the connecting parts and having a heat exchange medium circulated therein;
i) wherein the first and second internal connecting parts are shifted from one another in the direction in which the battery cells are stacked so a first internal connecting part and a second internal connecting part do not connect the same pair of partition walls;
j) wherein each of the heat exchange members is a heat pipe formed as a flat panel;, and
k) wherein the heat exchange pipes are arranged separately from each other.

2. The battery module of claim 1, wherein each of the first partition walls and the second partition walls has one connecting part per one pair.

3. The battery module of claim 1, wherein the connecting part is formed in a shape in which it is bent at a predetermined curvature.

4. The battery module of claim 1, wherein at least one battery cell is interposed between the two partition walls of the heat exchange member neighboring to each other.

* * * * *